United States Patent

McCauley et al.

Patent Number: 5,697,755
Date of Patent: Dec. 16, 1997

[54] FORKLIFT LEVEL INDICATOR

[76] Inventors: Charles A. McCauley, R.D. #2, Box 169, New Bethlehem, Pa. 16242; Larry D. McCauley, P.O. Box 56, Hawthorn, Pa. 16230

[21] Appl. No.: 397,940

[22] Filed: Mar. 3, 1995

[51] Int. Cl.⁶ .................. G01C 9/00; B66F 9/20
[52] U.S. Cl. ............ 414/634; 414/629; 414/698; 116/303; 33/333
[58] Field of Search ................. 414/628, 629, 414/632, 633, 634, 635, 698; 212/277; 172/430; 37/413; 116/DIG. 3, DIG. 13, 303, 284; 33/333, 613, 645

[56] References Cited

U.S. PATENT DOCUMENTS

| | | | |
|---|---|---|---|
| 816,422 | 3/1906 | Beaman. | |
| 1,795,406 | 3/1931 | Nash. | |
| 2,349,352 | 5/1944 | Johnson | 414/635 |
| 2,806,618 | 9/1957 | Cook | 414/634 X |
| 2,808,017 | 10/1957 | Killebrew | 116/124 |
| 2,835,220 | 5/1958 | Rardin | 33/333 X |
| 2,986,294 | 5/1961 | Granryd | 116/DIG. 13 X |
| 3,011,275 | 12/1961 | White, Jr. | 37/143 |
| 3,017,046 | 1/1962 | Runci et al. | 214/140 |
| 3,141,563 | 7/1964 | Fisher | 214/140 |
| 3,251,493 | 5/1966 | Popelier | 214/140 |
| 3,312,361 | 4/1967 | Foster | 214/145 |
| 3,542,227 | 11/1970 | Farmer | 414/634 |
| 3,678,885 | 7/1972 | Ferguson | 116/124 |
| 3,796,335 | 3/1974 | Smith et al. | 214/761 |
| 3,865,265 | 2/1975 | Brudi et al. | 214/674 |
| 3,883,021 | 5/1975 | Wilhelm | 214/672 |
| 4,391,563 | 7/1983 | Vietor | 414/698 |
| 4,418,636 | 12/1983 | Piper | 116/28 R |
| 5,131,801 | 7/1992 | Melanson | 414/635 |

FOREIGN PATENT DOCUMENTS

| | | | |
|---|---|---|---|
| 1092381 | 11/1960 | Germany | 414/629 |
| 2803854 | 8/1979 | Germany | 414/698 |
| 3304686 | 8/1984 | Germany | 33/333 |

*Primary Examiner*—Karen B. Merritt
*Assistant Examiner*—Stephen Gordon
*Attorney, Agent, or Firm*—Webb Ziesenheim Bruening Logsdon Orkin & Hanson, P.C.

[57] ABSTRACT

The present invention provides a mechanical forklift level indicator. The level indicator includes a first arm pivotally connected at a first end to a body of the forklift and a second arm pivotally connected at a first end thereof to the forklift mast assembly. The first and second arms are pivotally attached to each other at their second ends forming an intermediate pivot. A reference arm is secured to the second end of the first arm to form a fixed angle therewith. The pivoting of the forklift mast assembly will thereby cause relative motion between the second arm and the reference arm indicative of the relative orientation of the forks of the forklift.

12 Claims, 4 Drawing Sheets

FORKLIFT LEVEL INDICATOR

BACKGROUND OF THE INVENTION

1. Field of the Invention

The present invention relates to a mechanical forklift level indicator for accurately determining the relative orientation of the forks of the forklift.

2. Prior Art

In the operation of a forklift, it is essential that the forks be maintained as close to level as possible. For example, a warehouse arrangement may typically provide for multiple pallets to be stacked on top of each other, wherein the pallet located on the uppermost level can be fifteen to twenty feet above the floor. Without maintaining the pallet at level or near level conditions, there is a danger of the pallet dropping with the possible injury to the workmen, the product, the pallet, or the forklift itself. Additionally, without maintaining the pallets in a level orientation, the pallets may not properly fit on top of the previous stack resulting in the possibility of capsizing the stack. A further danger is the possibility of making the forklift unstable while transporting heavy objects if the objects are not in a level orientation.

In view of these concerns, various level indicating devices have been developed for forklifts, including those set forth in U.S. Pat. No. 3,312,361 to Foster, U.S. Pat. No. 3,865,265 to Brudi et al. and U.S. Pat. No. 3,883,021 to Wilhelm. All of these devices essentially work as a plumb bob to indicate the relative degree of tilt of the mast assembly. The difficulties with these arrangements are that errors in the plumb bob, such as by the introduction of foreign matter or the like, are not easily detected in the system.

A variety of other level indicating devices are known for use in crane derricks and for the buckets of earth-moving equipment. However, these devices are not easily translated to use with a forklift.

An object of the present invention is to overcome the aforementioned drawbacks of the prior art and to develop a simple, reliable indicating device for indicating the relative position of the forks of a forklift. A further object of the present invention is to provide a forklift level indicating device which can be easily viewed from the forklift operator's position, regardless of the height of the forks.

SUMMARY OF THE INVENTION

These and other advantages of the present invention are achieved by providing a mechanical forklift level indicator which includes a two arm linkage. The first arm of the linkage is pivotally connected at a first end thereof to a body of the forklift. Preferably, the first arm is pivotally connected to the cab post of the forklift. A second arm is pivotally connected at a first end thereof to the forklift mast assembly of the forklift which includes the forks. A second end of the second arm is pivotally connected to the second end of the first arm providing an intermediate pivot point for the two arm linkage. A reference arm is attached to the second end of the first arm forming a fixed angle with the first arm. In this arrangement, the pivoting of the forklift mast assembly relative to the body will result in relative movement between the second arm and the reference arm to indicate the relative position of the forks of the forklift.

In one embodiment of the present invention, the reference arm is aligned with the second arm when the forks are substantially level with respect to the horizontal. In this arrangement, the relative position of the second arm to the reference arm will be indicative of the positioning of the forks of the mast assembly with respect to the horizontal. Additionally, both the second arm and the reference arm may include indicating indicia in the form of bright colored bands. The reference arm may be shorter in length than the second arm with the indicating indicia of the second arm spaced beyond the end of the reference arm. The relative position of the second arm would be easily visible throughout its motion. The fixed angle between the reference arm and the first arm may be about 90°. Additionally, the second arm may be positioned to be substantially horizontal when the forks are substantially level with respect to the horizontal.

These and other objects of the present invention will be clarified in the description of the present invention taken together with the attached figures in which like reference numerals indicate like elements throughout.

BRIEF DESCRIPTION OF THE PREFERRED EMBODIMENT

Figure 1:
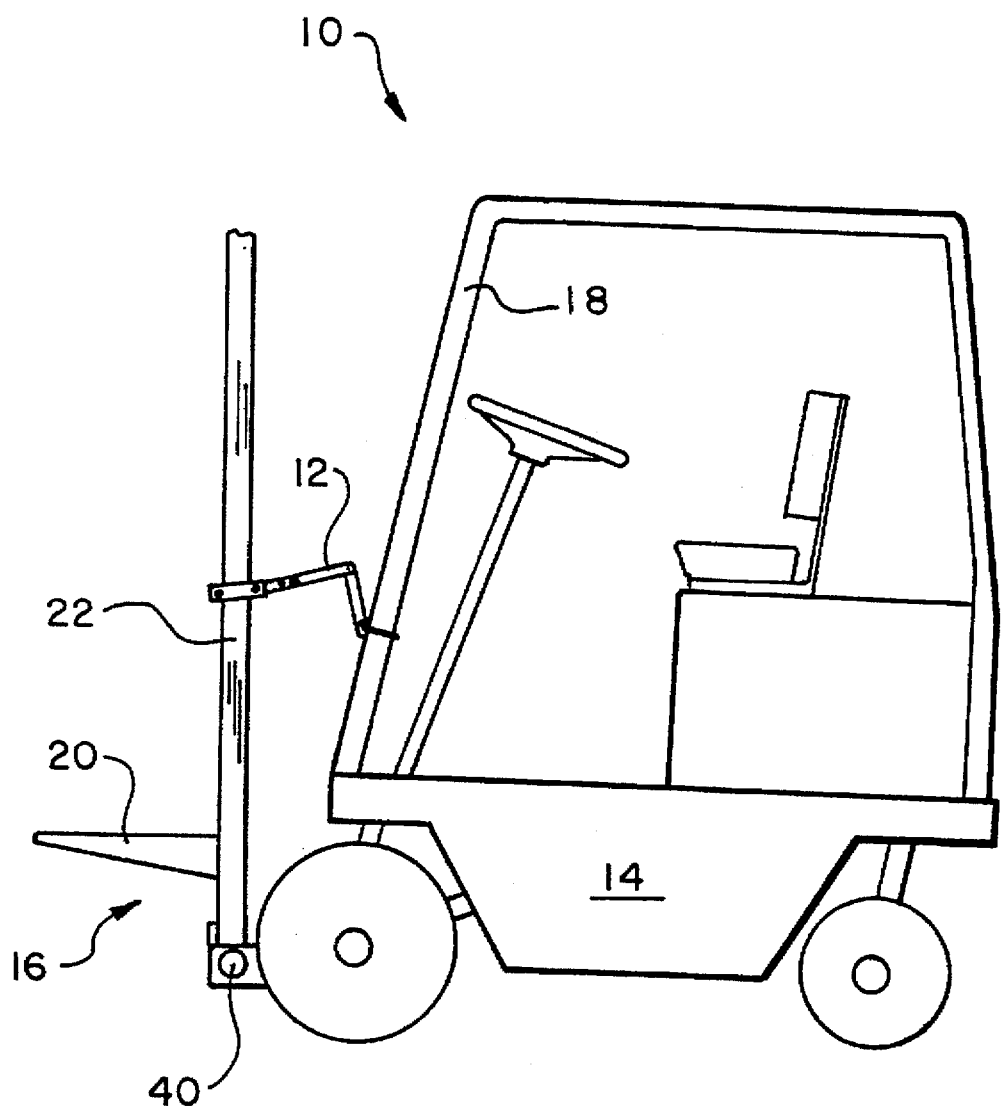
FIG. 1 schematically illustrates a forklift including a forklift level indicator according to the present invention.

FIG. 1 schematically illustrates a forklift 10 including a forklift level indicator 12 according to the present invention. The forklift 10 is a conventional forklift including a main body 14 and a mast assembly 16 pivotally coupled to the main body 14. The main body 14 includes a cab portion defined by cab posts 18. The pivotable mast assembly 16 includes forks 20 upon which objects transported by the forklift 10 are positioned. The mast assembly 16 additionally includes a mast 22. The forks 20 are movable along the mast 22 in a conventional fashion to allow the forklift 10 to operate on objects at varying heights.

Figure 2:
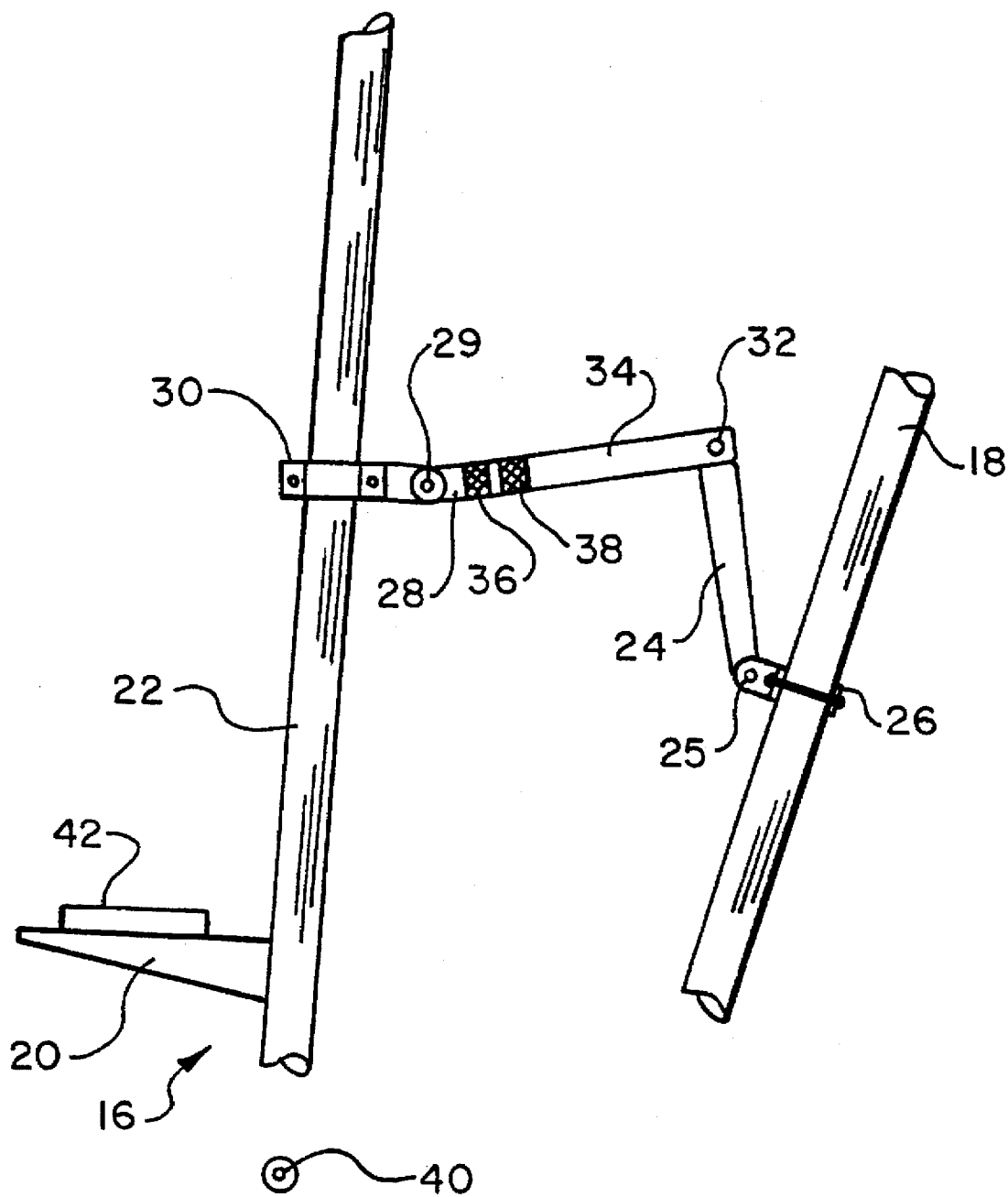
FIG. 2 is an enlarged view of the forklift level indicator shown in FIG. 1 with the forks in a substantially horizontal position.
Figure 3:
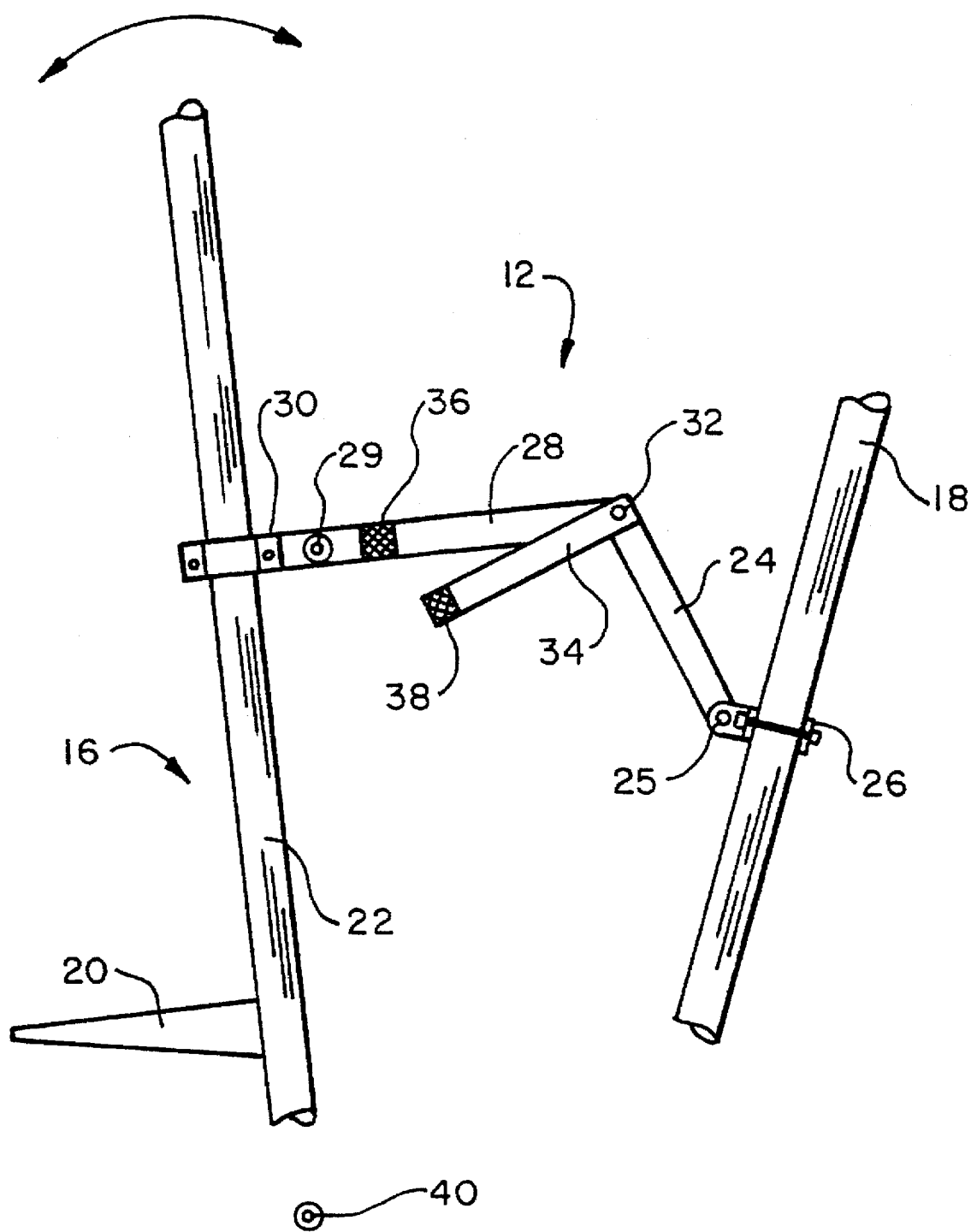
FIG. 3 illustrates the forklift level indicator of FIGS. 1 and 2 with the forks pivoted forward with respect to the body.
Figure 4:
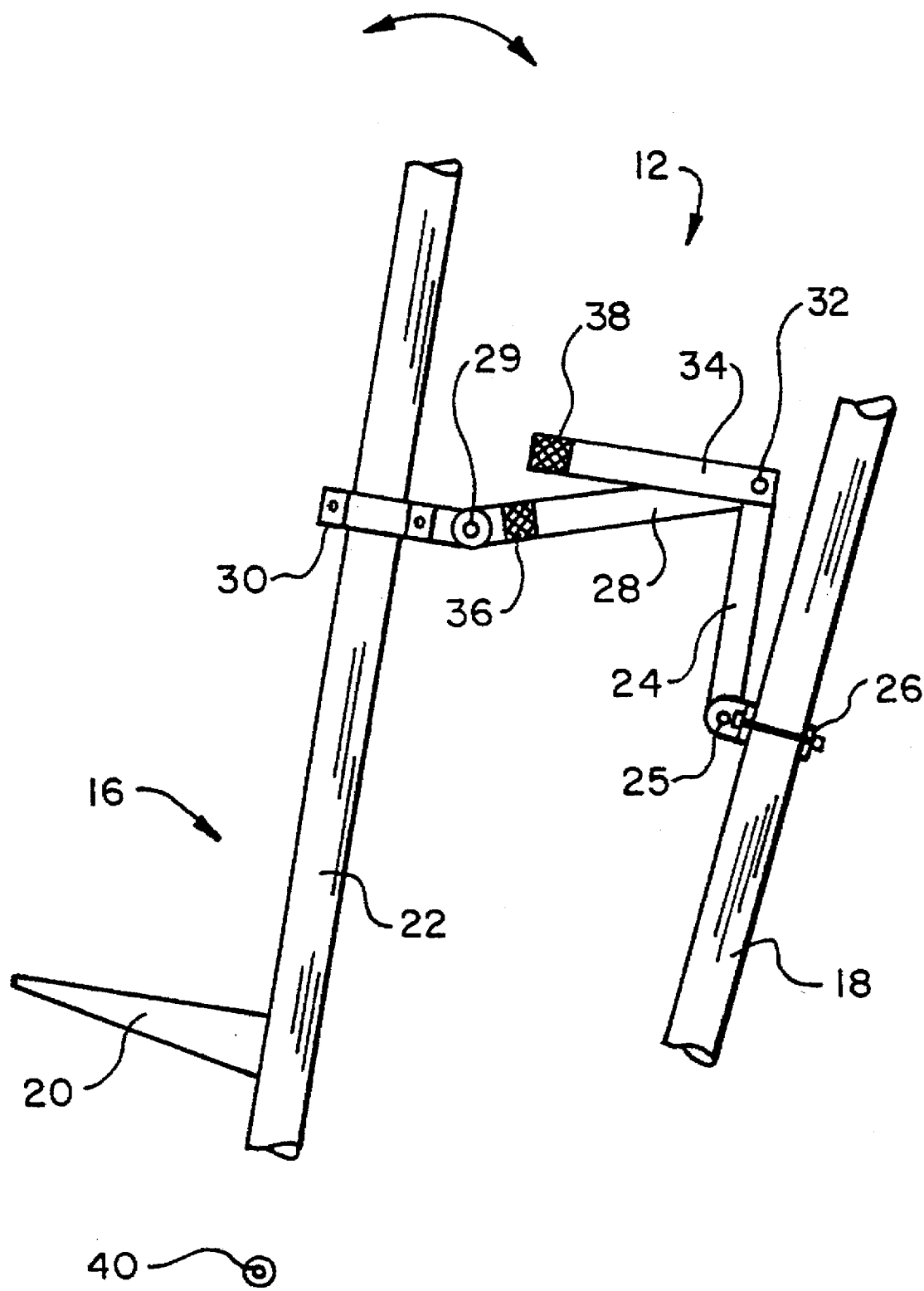
FIG. 4 illustrates the forklift level indicator of FIGS. 1–3 with the forks pivoted backward toward the body.

As best seen in FIGS. 2–4, the forklift level indicator 12 is in the form of a two arm linkage. A first arm 24 is pivotally connected through pivot 25 at a first end thereof to the cab posts 18 by anchor clamp 26. A first end of a second arm 28 is pivotally connected through pivot 29 to mast 22 by anchor clamp 30. The second end of the first arm 24 and the second end of the second arm 28 are pivotally connected to each other to form an intermediate pivot 32 of the two arm linkage.

A reference arm 34 is provided with a first free end and an opposed second end fixed to the second end of the first arm 24 at the intermediate pivot 32. The reference arm forms a fixed angle with the first arm of about 90°. The reference arm 34 may be secured to the first arm 24 by welding or the like.

The second arm and the reference arm include indicating indicia 36 and 38, respectively, thereon in the form of brightly colored bands. The reference arm 34 is preferably shorter than the second arm 28 with the indicating indicia 38 being positioned on the free end of the reference arm 34. The indicating indicia 36 is preferably positioned adjacent the first end of the second arm 28. This position of the indicating indicia 36 is preferably spaced farther from the intermediate pivot 32 than the free end and the indicating indicia 38 of the reference arm 34. This arrangement provides that the indicating indicia 36 can be easily visible throughout the motion of the second arm 28 relative to the reference arm 34.

With this arrangement, the pivoting of the mast assembly 16 relative to the main body 14 will cause relative movement between the second arm 28 and the reference arm 34, as shown in FIGS. 2-4. In an initial setup, it is preferred that one of the anchor clamps 26 or 30 be secured to attach one end of the forklift level indicator 12 in position. The mast assembly 16 is then pivoted about pivot point 40 until the forks 20 are in a substantially horizontal or level orientation. This orientation can be easily checked by a conventional spirit level 42, as shown in FIG. 2. When the forks 20 are in the level position, the second arm 28 and the reference arm 34 are aligned with each other and the remaining anchor clamp 26 or 30 secured. This will provide an easily, visually identified level position when the reference arm 34 and the second arm 28 are aligned. As shown in FIGS. 3 and 4, the pivoting of the mast assembly 16 about the pivot point 40 will cause relative movement between the second arm 28 and the reference arm 34, whereby the relative position of the second arm 28 and the reference arm 34 will be indicative of the position of the forks 20 with respect to the horizontal.

It is also anticipated that in the initial setup of the forklift level indicator 12, the second arm 28 and reference arm 34 may both be aligned and positioned horizontal when the forks 20 are horizontal. This arrangement will accurately portray the relative position or orientation of the forks 20.

The present invention provides an easy mechanical forklift level indicating device which can be easily viewed by the operator, regardless of the height of the forks 20. Additionally, the device represents a sturdy indicating mechanism which is not easily damaged.

It will be obvious to those of ordinary skill in the art that various modifications may be made to the present invention without departing from the spirit and scope thereof. For example, the angle between the reference arm 34 and the first arm 24 may be provided at angles other than 90°. Other similar modifications may be made to the present invention without departing from the scope intended to be covered by the present invention. Consequently, the scope of the present invention is intended to be defined by the attached claims.

What is claimed is:

1. A forklift level indicator comprising:
   a first arm adapted to be pivotally connected at a first end thereof to a body of the forklift;
   a second arm adapted to be pivotally connected at a first end thereof to a forklift mast assembly of the forklift wherein the forklift mast assembly of the forklift includes the forks and is pivotable with respect to the body of the forklift, a second end of said second arm pivotally connected to a second end of said first arm;
   a reference arm attached to said second end of said first arm forming a fixed angle with said first arm, whereby the pivoting of the forklift mast assembly relative to the body will result in relative movement between said second arm and said reference arm;
   indicating indicia on said second arm; and
   indicating indicia on said reference arm, wherein said indicating indicia on said second arm and on said reference arm are both formed of bright colored bands.

2. The indicator of claim 1 wherein said reference arm is aligned with said second arm when the forks of the forklift are substantially level with respect to the horizontal.

3. The indicator of claim 1 wherein said fixed angle formed between said reference arm and said first arm is about 90°.

4. The indicator of claim 1 wherein said second arm is substantially horizontal when the forks of the forklift are substantially level with respect to the horizontal.

5. The indicator of claim 1 wherein said reference arm is shorter in length than said second arm.

6. The indicator of claim 5 further including indicating indicia on said second arm.

7. The indicator of claim 6, wherein the length between said indicating indicia and said second end of said first arm is longer than said length of said reference arm.

8. A level indicator for a forklift having a forklift mast assembly with forks of the forklift being pivotable relative to a body of the forklift, said level indicator comprising:
   a first linkage arm with a first end pivotally attached to the body of the forklift and a second end spaced from said first end;
   a second linkage arm having a first end configured to be pivotally attached to the forklift mast assembly and a second end spaced from said second arm first end and pivotally attached to said second end of said first linkage arm, said second linkage arm including indicating indicia substantially adjacent said second arm first end; and
   a reference arm having a first free end and a second end spaced from said first free end and attached to said second end of said first linkage arm, whereby said reference arm forms a fixed angle with said first linkage arm, said reference arm including indicating indicia on said first free end, wherein said indicating indicia of said second linkage arm is spaced farther from said second end of said first linkage arm than said indicating indicia of said first free end of said reference arm;
   whereby the pivoting of the forklift mast assembly and the forks relative to the body will result in relative movement between said second linkage arm and said reference arm, wherein said reference arm is aligned with said second linkage arm when the forks of the forklift are substantially level with respect to the horizontal, and said first free end of said reference arm is positioned vertically above said second arm when the forks of the forklift are angled relative to the horizontal by pivoting of the forks with respect to the body of the forklift in a first direction relative to the horizontal position of the forks, and said first free end of said reference arm is positioned vertically below said second arm when the forks of the forklift are angled relative to the horizontal by pivoting of the forks with respect to the body of the forklift in an opposite direction from said first direction relative to the horizontal position of the forks.

9. The level indicator of claim 8 wherein said fixed angle is about 90°.

10. The level indicator of claim 9 wherein said indicating indicia on said second linkage arm and said reference arm are formed of brightly colored bands.

11. A forklift with a fork level indicator comprising:
   a main body portion;
   a forklift mast assembly pivotally attached to said main body portion and having forks for receiving objects thereon;
   a level indicator for indicating the relative position of said forks, said level indicator including a first arm pivotally connected at a first end thereof to said main body portion; and a second arm pivotally connected at a first end thereof to said forklift mast assembly and pivotally connected at a second end thereof to a second end of said first arm, and a reference arm attached to said second end of said first arm forming a fixed angle between said reference arm and said first arm, said reference arm having a free end spaced from said first arm, whereby the pivoting of said forklift mast assembly relative to said main body portion will result in relative motion between said second arm and said reference arm, and wherein said reference arm is aligned with said second arm when said forks are substantially level with respect to the horizontal, and said free end of said reference arm is positioned vertically above said second arm when said forks are angled relative to the horizontal pivoting of said forklift mast assembly with respect to said main body portion in a first direction relative to said horizontal position of said forks, and said free end of said reference arm is positioned vertically below said second arm when said forks are angled relative to said horizontal position by pivoting of said forklift mast assembly with respect to said main body portion in an opposite direction to said first direction relative to said horizontal position of said forks.

12. The forklift of claim 11 wherein said reference arm is shorter in length than said second arm.

* * * * *

UNITED STATES PATENT AND TRADEMARK OFFICE
CERTIFICATE OF CORRECTION

PATENT NO. : 5,697,755
DATED : December 16, 1997
INVENTOR(S) : Charles A. McCauley and Larry D. McCauley It is certified that error appears in the above-identified patent and that said Letters Patent is hereby corrected as shown below:

Claim 11 Column 6 Line 1 "horizontal pivoting" should read --horizontal by pivoting--.

Signed and Sealed this

Sixteenth Day of March, 1999

Attest:

Q. TODD DICKINSON

Attesting Officer

Acting Commissioner of Patents and Trademarks